US008824853B2

(12) United States Patent
Kasai

(10) Patent No.: US 8,824,853 B2
(45) Date of Patent: Sep. 2, 2014

(54) SHOOTING APPARATUS WITH CONTROLLED VIDEO RECORDING

(75) Inventor: Tsubasa Kasai, Hachioji (JP)

(73) Assignee: Olympus Medical Corp., Tokyo (JP)

( * ) Notice: Subject to any disclaimer, the term of this patent is extended or adjusted under 35 U.S.C. 154(b) by 344 days.

(21) Appl. No.: 13/177,131

(22) Filed: Jul. 6, 2011

(65) Prior Publication Data
US 2012/0008923 A1 Jan. 12, 2012

(30) Foreign Application Priority Data

Jul. 7, 2010 (JP) .................................. 2010-155194
Aug. 6, 2010 (JP) .................................. 2010-177878

(51) Int. Cl.
*H04N 5/932* (2006.01)
*H04N 9/82* (2006.01)
*G11B 27/034* (2006.01)
*H04N 9/804* (2006.01)
*H04N 5/232* (2006.01)
*H04N 5/907* (2006.01)
*H04N 5/77* (2006.01)

(52) U.S. Cl.
CPC ............. *H04N 5/772* (2013.01); *H04N 9/8211* (2013.01); *G11B 27/034* (2013.01); *H04N 9/8042* (2013.01); *H04N 5/23209* (2013.01); *H04N 5/907* (2013.01)
USPC .......................................... 386/210; 386/224

(58) Field of Classification Search
None
See application file for complete search history.

(56) References Cited

U.S. PATENT DOCUMENTS

| 7,453,783 | B2 * | 11/2008 | Matsui ........................ 369/53.31 |
| 8,040,380 | B2 * | 10/2011 | Endo ........................... 348/208.4 |
| 8,339,473 | B2 * | 12/2012 | Fukugawa et al. .......... 348/226.1 |
| 8,573,781 | B2 * | 11/2013 | Koyama ......................... 353/85 |

FOREIGN PATENT DOCUMENTS

| JP | 10-215434 | 8/1998 |
| JP | 2005-277609 | 10/2005 |

* cited by examiner

*Primary Examiner* — William C Vaughn, Jr.
*Assistant Examiner* — Eileen Adams
(74) *Attorney, Agent, or Firm* — John C. Pokotylo; Straub & Pokotylo

(57) ABSTRACT

A shooting apparatus includes: a stop/resumption determination unit that determines stop and resumption of recording of a moving image being shot by an image pickup unit provided in a shooting apparatus body; an unnecessary part determination unit that determines an unnecessary part of the moving image based on at least one of a state change of the shooting apparatus body and a state change of the moving image; and a recording control unit that records, as a single video file, the moving image except a moving image part corresponding to a stop period from the stop to the resumption and a moving image part determined as the unnecessary part.

14 Claims, 18 Drawing Sheets

FIG.2
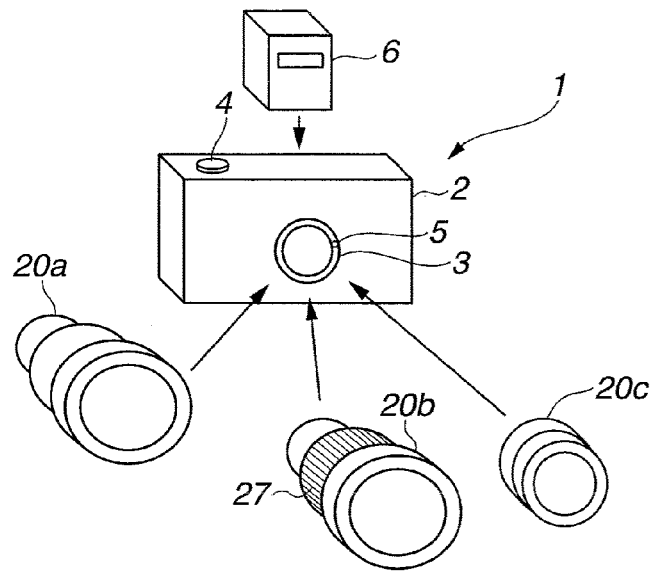
FIG.3A      FIG.3B
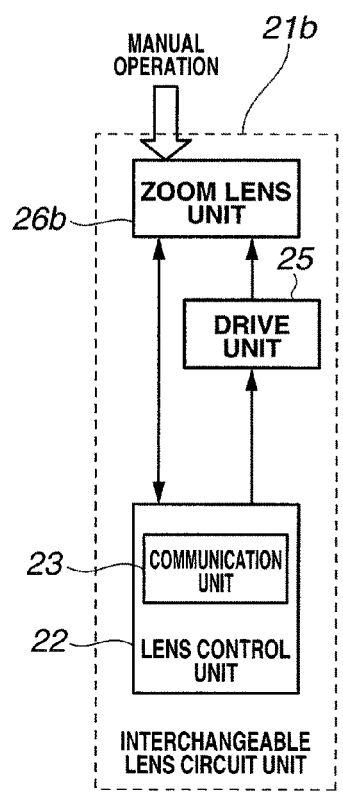 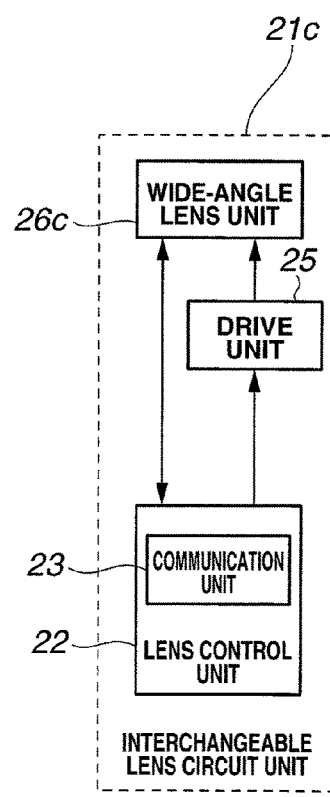

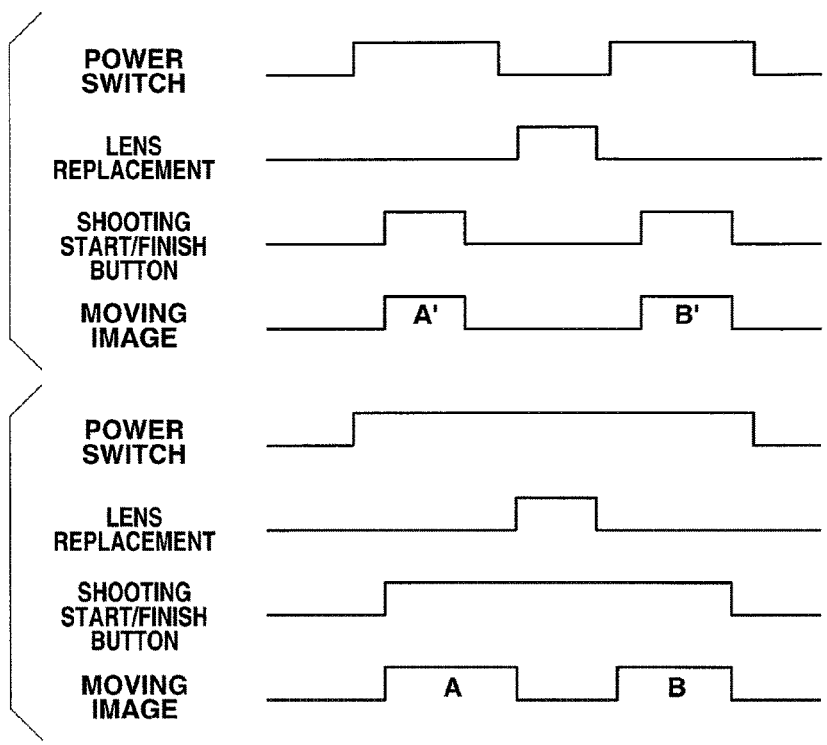

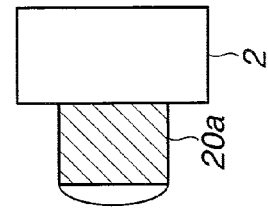
FIG.10A
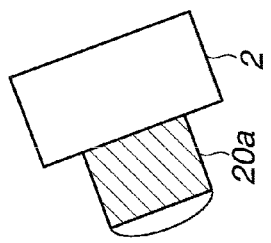
FIG.10B
FIG.10C
FIG.10D
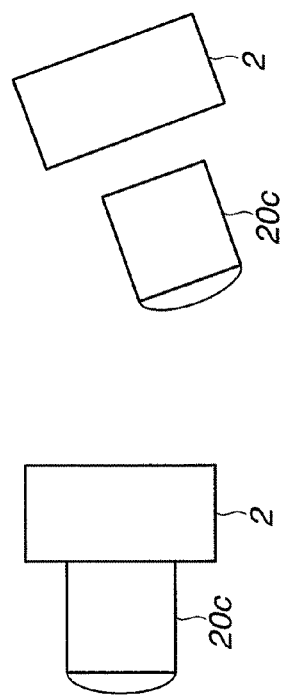
FIG.10E
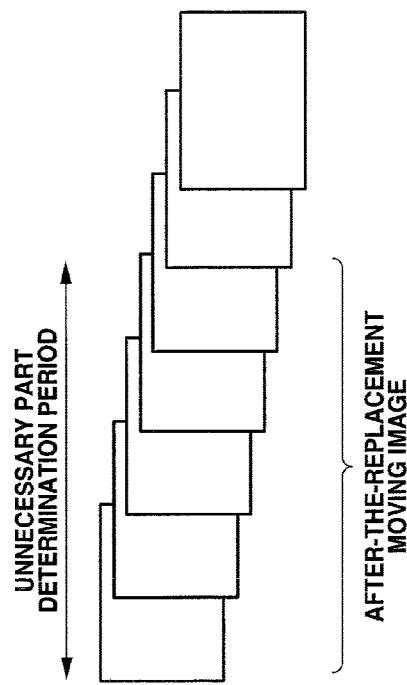
FIG.10F
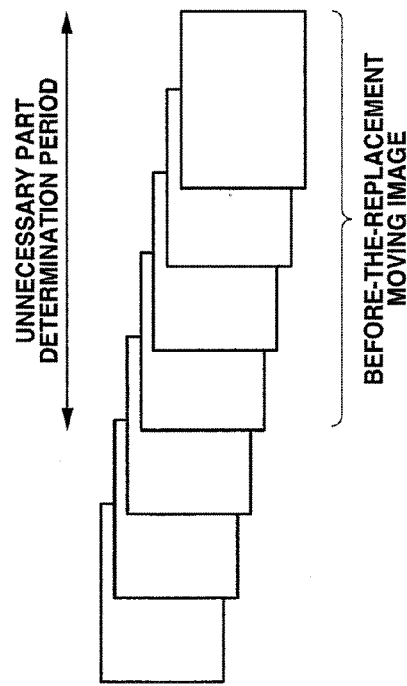

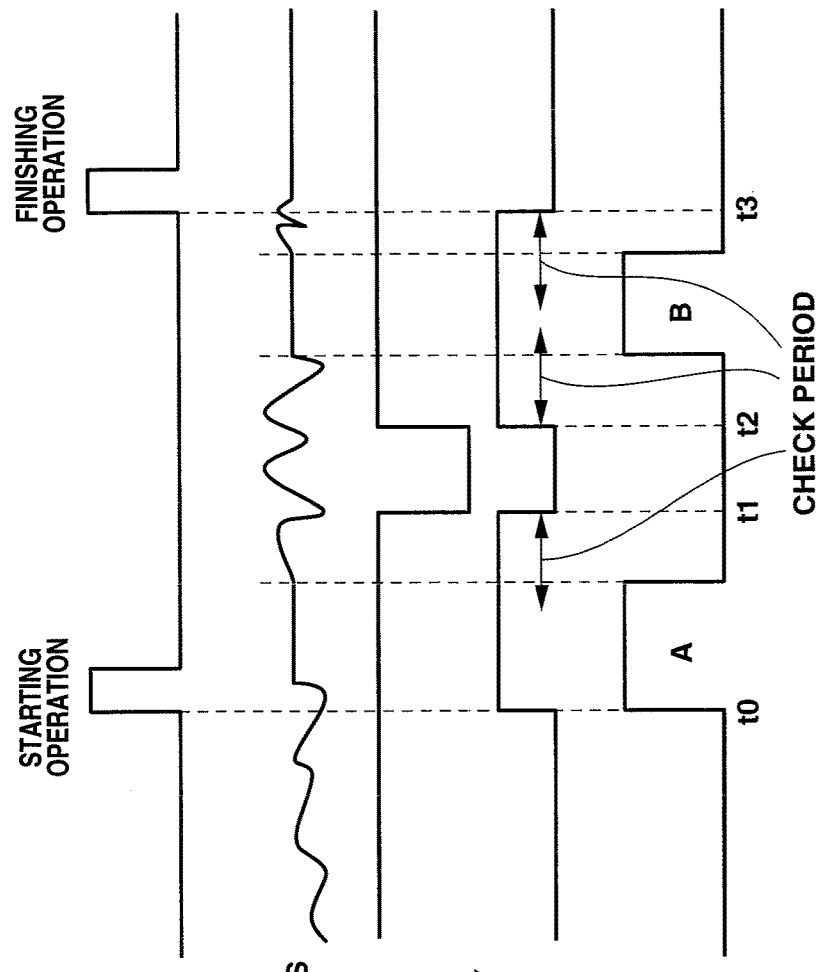

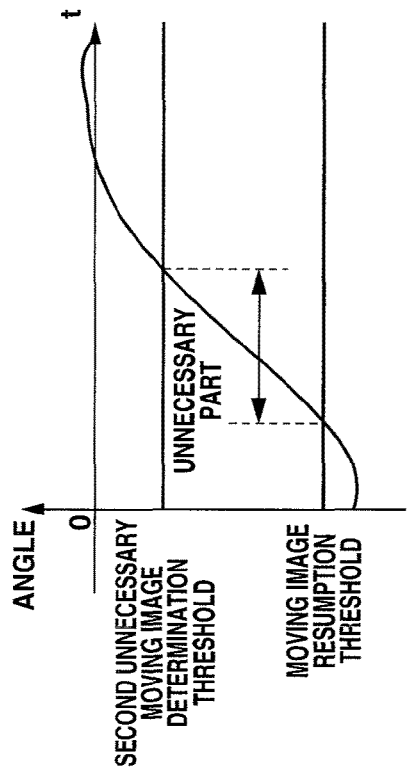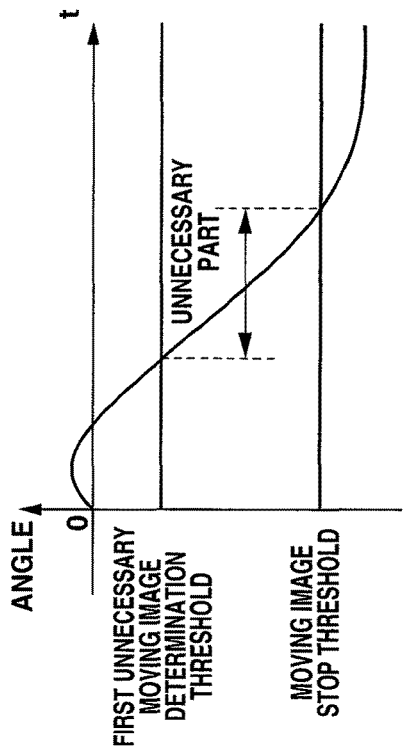

FIG.19A
FIG.19B
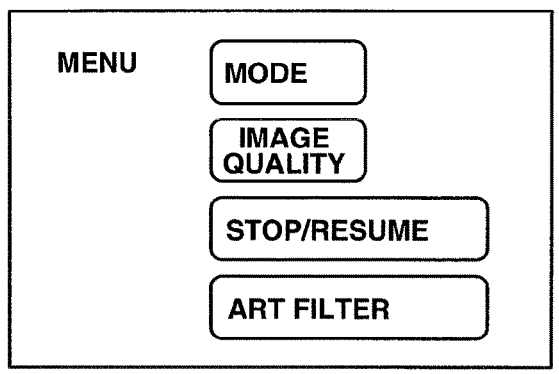
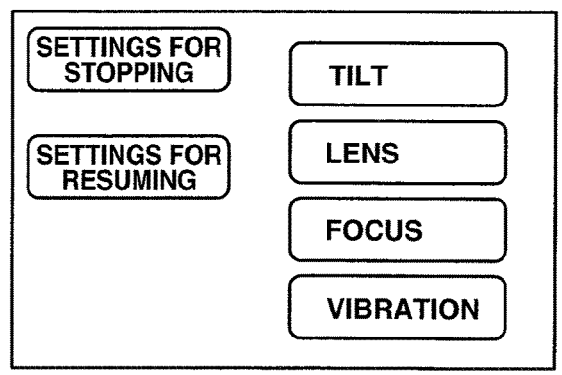

SHOOTING APPARATUS WITH CONTROLLED VIDEO RECORDING

This application claims benefit of Japanese Application No. 2010-155194 filed in Japan on Jul. 7, 2010 and No. 2010-177878 filed in Japan on Aug. 6, 2010, the contents of which are incorporated by this reference.

BACKGROUND OF THE INVENTION

1. Field of the Invention

The present invention relates to a shooting apparatus capable of shooting a moving image by selectively attaching a plurality of interchangeable lenses.

2. Description of the Related Art

Recently, many mobile devices with shooting capability (shooting apparatuses), such as digital cameras, have functions of not only shooting still images but also shooting moving images. In the field of digital single-lens reflex cameras, interchangeable lenses and accessories are detachably or expansively configured from a system aspect to address various scenes. In some shooting apparatuses of this type, interchangeable lens information is sent from an interchangeable lens to a camera body to rewrite data such as processing variables in the camera body.

During moving image shooting, an interchangeable lens may be replaced with another in order to enhance a shooting effect. In this case, the moving image shooting is stopped, the power is turned off, the interchangeable lens is replaced, the power is again turned on, and the moving image shooting is resumed. Unfortunately, through such a shooting process, different moving image files are generated before and after the replacement of the interchangeable lens, possibly resulting in an insufficient shooting effect.

In this regard, Japanese Patent Application Laid-Open Publication No. 10-215434 proposes a method of editing a plurality of pieces of shot moving image data.

Also, moving images shot by a shooting apparatus having a moving image shooting function are typically images of short duration, or what may be called piecemeal images.

In this regard, Japanese Patent Application Laid-Open Publication No. 2005-277609 discloses a technique of connecting moving images within a predetermined time period.

SUMMARY OF THE INVENTION

A shooting apparatus according to an aspect of the present invention includes: a stop/resumption determination unit that determines stop and resumption of recording of a moving image being shot by an image pickup unit provided in a shooting apparatus body; an unnecessary part determination unit that determines an unnecessary part of the moving image based on at least one of a state change of the shooting apparatus body and a state change of the moving image; and a recording control unit that records, as a single video file, the moving image except a moving image part corresponding to a stop period from the stop to the resumption and a moving image part determined as the unnecessary part.

A shooting apparatus in another aspect of the present invention is a shooting apparatus capable of moving image shooting with a plurality of interchangeable lenses selectively attached to a shooting apparatus body, the apparatus including: an attachment/detachment detection unit that detects attachment and detachment of each interchangeable lens; a shooting control unit that controls stop and resumption of the moving image shooting according to a detection result of the attachment/detachment detection unit during the moving image shooting; and a recording control unit that records, as a single video file, a moving image before the stop of the moving image shooting and a moving image after the resumption of the moving image shooting.

The above and other objects, features and advantages of the invention will become more clearly understood from the following description referring to the accompanying drawings.

BRIEF DESCRIPTION OF THE DRAWINGS

FIG. 2 is an illustrative diagram showing an external view of the shooting apparatus 1 in FIG. 1 and interchangeable lenses to be attached to the shooting apparatus 1;

FIGS. 3A and 3B are block diagrams showing circuit configurations of the interchangeable lenses 20b and 20c in FIG. 2;

FIGS. 4A and 4B are timing charts for describing operations in the first embodiment;

FIGS. 10A to 10F are illustrative diagrams for describing the processing in FIG. 9;

FIGS. 13A to 13E are timing charts for describing operations in the third embodiment;

FIGS. 18A and 18B are illustrative diagrams showing how to determine stop and resumption of moving image shooting;

FIGS. 19A and 19B are illustrative diagrams showing a menu display that aids user operations for setting thresholds for stop determination;

DETAILED DESCRIPTION OF THE PREFERRED EMBODIMENTS

With reference to the drawings, embodiments of the present invention will be described in detail below.

First Embodiment

Figure 1:
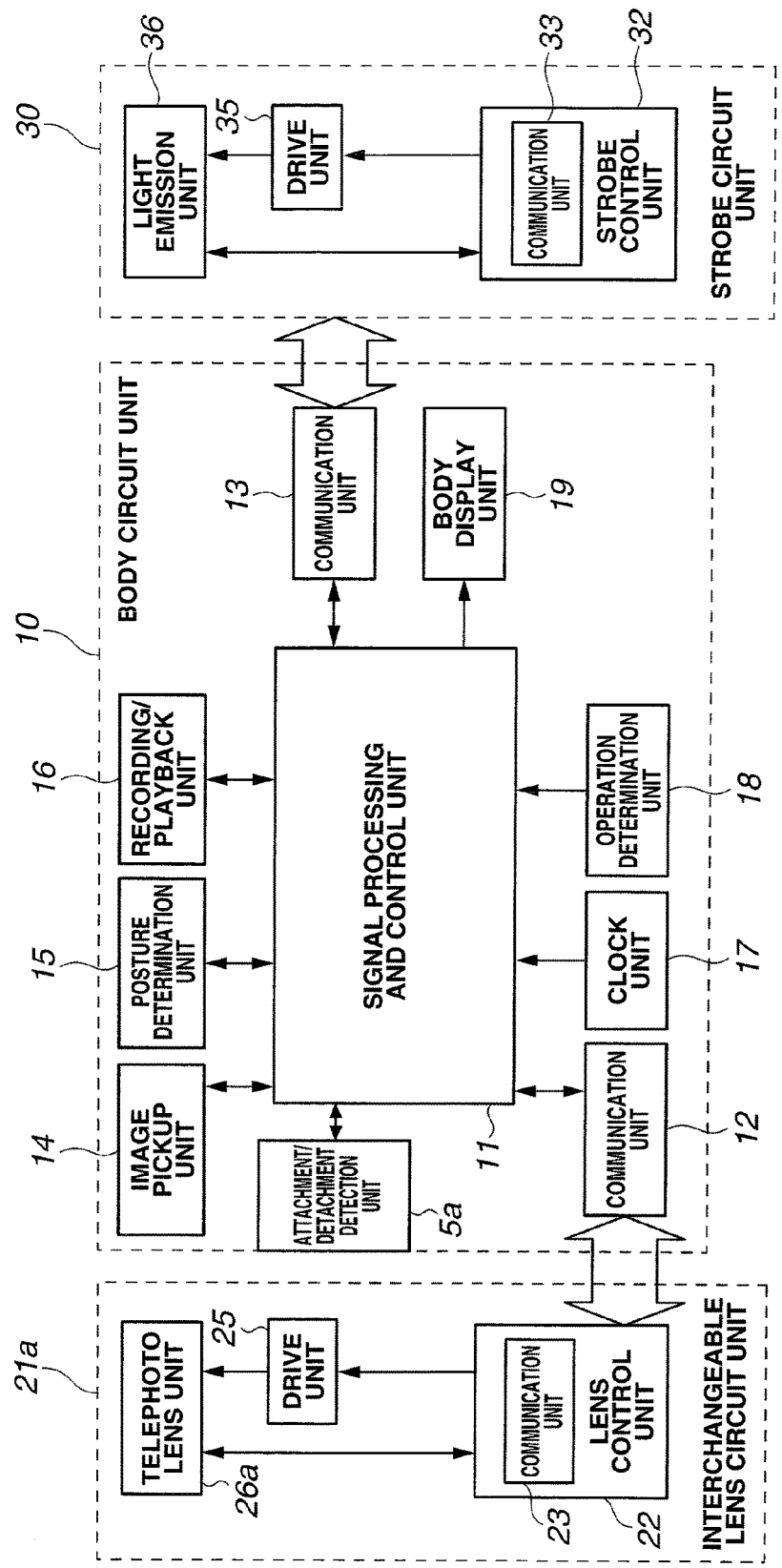
FIG. 1 is a block diagram showing a circuit configuration of a shooting apparatus according to a first embodiment of the present invention.

FIG. 1 is a block diagram showing a circuit configuration of a shooting apparatus according to a first embodiment of the present invention. FIG. 2 is an illustrative diagram showing an external view of the shooting apparatus 1 in FIG. 1 and interchangeable lenses to be attached to the shooting apparatus 1. FIGS. 3A and 3B are block diagrams showing circuit configurations of the interchangeable lenses 20b and 20c in FIG. 2.

In FIG. 2, the shooting apparatus 1 has a lens mount unit 3 on the front face of a shooting apparatus body 2, so that interchangeable lenses such as 20a, 20b, and 20c (hereinafter collectively referred to as an interchangeable lens 20) can be attached. A shooting start/finish button 4 is disposed on the top portion of the shooting apparatus body 2.

The lens mount unit 3 on the shooting apparatus body 2 is provided with a lens replacement switch 5. The lens replacement switch 5 toggles its state in response to every attachment and detachment of the interchangeable lens 20 to and from the lens mount unit 3. Whether or not the interchangeable lens 20 is attached to the lens mount unit 3 can be known by detecting the state of the lens replacement switch 5.

A strobe 6 is detachably attached on the top face of the shooting apparatus body 2 with an attachment unit (not shown).

Circuit Configuration

The shooting apparatus body 2 of the shooting apparatus 1 includes a body circuit unit 10. As shown in FIG. 1, the body circuit unit 10 is provided with communication units 12 and 13. The interchangeable lenses 20a to 20c to be attached include interchangeable lens circuit units 21a to 21c (see FIGS. 3A and 3B) (hereinafter collectively referred to as an interchangeable lens circuit unit 21). The interchangeable lens circuit unit 21 is also provided with a communication unit 23. The communication unit 12 in the body circuit unit 10 can send and receive information to and from the communication unit 23 in the interchangeable lens circuit unit 21.

The strobe 6 includes a strobe circuit unit 30. The strobe circuit unit 30 is also provided with a communication unit 33. The body circuit unit 10 is provided with the communication unit 13, which can send and receive information to and from the communication unit 33 in the strobe circuit unit 30.

The interchangeable lens 20a has a telephoto lens unit 26a. The telephoto lens unit 26a has an auto-focus function such that the telephoto lens unit 26a is driven by a drive unit 25 to enable focusing. The interchangeable lens 20b has a zoom lens unit 26b that includes a zoom lens. Zooming with the zoom lens unit 26b is performed by manually operating a zoom ring 27. The zoom lens unit 26b also has an auto-focus function such that the zoom lens unit 26b is driven by the drive unit 25 to enable focusing. The interchangeable lens 20c has a wide-angle lens unit 26c. The wide-angle lens unit 26c has an auto-focus function such that the wide-angle lens unit 26c is driven by the drive unit 25 to enable focusing.

A lens control unit 22 of each of the interchangeable lenses 20a to 20c, under the control of the body circuit unit 10, can control the drive unit 25 and drive the telephoto lens unit 26a, the zoom lens unit 26b, or the wide-angle lens unit 26c (hereinafter collectively referred to as a lens unit 26) to control a diaphragm, focus, zoom, etc., of the lens unit 26.

The communication unit 23 in the lens control unit 22 sends and receives information to and from the communication unit 12 in the body circuit unit 10 via a predetermined transmission path. Once communication with the communication unit 12 in the body circuit unit 10 is established, the lens control unit 22 can cause the communication unit 23 to send lens information to the body circuit unit 10. This allows the body circuit unit 10 to recognize the zoom factor, the focal length, the brightness number, etc., of the interchangeable lens 20. It is to be noted that, besides the interchangeable lenses 20a to 20c, various interchangeable lenses can be employed in the present embodiment.

The strobe circuit unit 30 has a light emission unit 36. A strobe control unit 32, under the control of the body circuit unit 10, controls a drive unit 35 to cause the light emission unit 36 to emit light.

In the present embodiment, the state of the lens replacement switch 5 provided on the lens mount unit 3 is detected by an attachment/detachment detection unit 5a in the body circuit unit 10. The attachment/detachment detection unit 5a detects whether the interchangeable lens 20 is attached to or detached from the lens mount unit 3 based on the state of the lens replacement switch 5 and outputs the attachment/detachment detection result to a signal processing and control unit 11.

The body circuit unit 10 has an image pickup unit 14 that includes an image pickup device such as a CCD or CMOS sensor. An optical image of a shooting object from the interchangeable lens 20 is formed on an image pickup face of the image pickup device included in the image pickup unit 14. The image pickup unit 14 is driven and controlled by the signal processing and control unit 11. The signal processing and control unit 11 outputs a driving signal for the image pickup device to the image pickup unit 14, and also takes in an image signal obtained by the image pickup device through photoelectric conversion of the optical image.

The signal processing and control unit 11 performs predetermined signal processing, for example color signal generation processing, matrix conversion processing, and other various digital processing, for the image signal obtained by the image pickup device through the photoelectric conversion. When signals such as an image signal and an audio signal are recorded, the signal processing and control unit 11 can output information such as image information and audio information compressed through encoding processing.

A clock unit 17 and an operation determination unit 18 are also disposed in the body circuit unit 10. The clock unit 17 generates time information for use by the signal processing and control unit 11. The operation determination unit 18 generates operation signals based on user operations performed on the shooting start/finish button 4 and various switches (not shown) such as a shooting-mode setting switch provided on the shooting apparatus 1, and outputs the generated operation signals to the signal processing and control unit 11. The signal processing and control unit 11 controls each unit based on the operation signals.

The body circuit unit 10 is provided with a recording/playback unit 16 and a body display unit 19. The recording/playback unit 16 can record image information and audio information from the signal processing and control unit 11 on a recording medium (not shown). The recording/playback unit 16 may be a card interface, for example, so that the recording/playback unit 16 can record information such as image information and audio information on a medium such as a memory card. The recording/playback unit 16 can read image information and audio information recorded on a recording medium and supply the information to the signal processing and control unit 11. The signal processing and control unit 11 can decode the image information and the audio information from the recording/playback unit 16 to obtain an image signal and an audio signal.

A picked-up image from the image pickup unit 14 and a playback image from the recording/playback unit 16 can be supplied to the body display unit 19 from the signal processing and control unit 11, and the body display unit 19 can display these images. The body display unit 19 can also display a menu display or the like for operating the shooting apparatus 1, under the control of the signal processing and control unit 11.

In the present embodiment, the signal processing and control unit 11, the recording/playback unit 16, and the body display unit 19 can perform processing for a moving image based on an image pickup signal from the image pickup unit 14. That is, the signal processing and control unit 11 performs predetermined signal processing for an image pickup signal from the image pickup unit 14 to generate a video signal of a moving image, and provides the video signal to the body display unit 19 to be displayed. The signal processing and control unit 11 also compresses the generated video signal and provides the compressed video signal to the recording/playback unit 16. The recording/playback unit 16 can record the video signal from the signal processing and control unit 11 on a recording medium (not shown), and also read a video signal recorded on the recording medium and output the video signal to the signal processing and control unit 11. The signal processing and control unit 11 can decode the video signal from the recording/playback unit 16 and provide the video signal to the body display unit 19 to be displayed.

In the present embodiment, when the signal processing and control unit 11 provides the generated video signal to the recording/playback unit 16 to be recorded, the signal processing and control unit 11 compiles the recorded video signal into a file based on a user operation. The file compilation enables various sorts of processing based on user operations, for example playback processing, to be performed for the video signal recorded by the recording/playback unit 16 and compiled into a file (hereinafter referred to as a video file).

Further, in the present embodiment, the signal processing and control unit 11 can control stopping and resuming the recording process of generating a video signal and providing the video signal to the recording/playback unit 16 to be recorded. Still further, the signal processing and control unit 11 can control the recording/playback unit 16 to connect two video files compiled and recorded on the recording medium and record the connected video files as a single video file on a recording medium.

In the present embodiment, based on the attachment/detachment detection result of the attachment/detachment detection unit 5a, the signal processing and control unit 11 controls stopping and resuming the recording process and controls the processing of connecting video files.

Although the attachment and detachment of the interchangeable lens 20 is detected by the attachment/detachment detection unit 5a in the present embodiment, the attachment and detachment of the interchangeable lens 20 may be detected in other ways. For example, the signal processing and control unit 11 may determine the attachment and detachment of the interchangeable lens 20 by detecting whether or not communication between the communication units 12 and 23 is possible.

Figure 5:
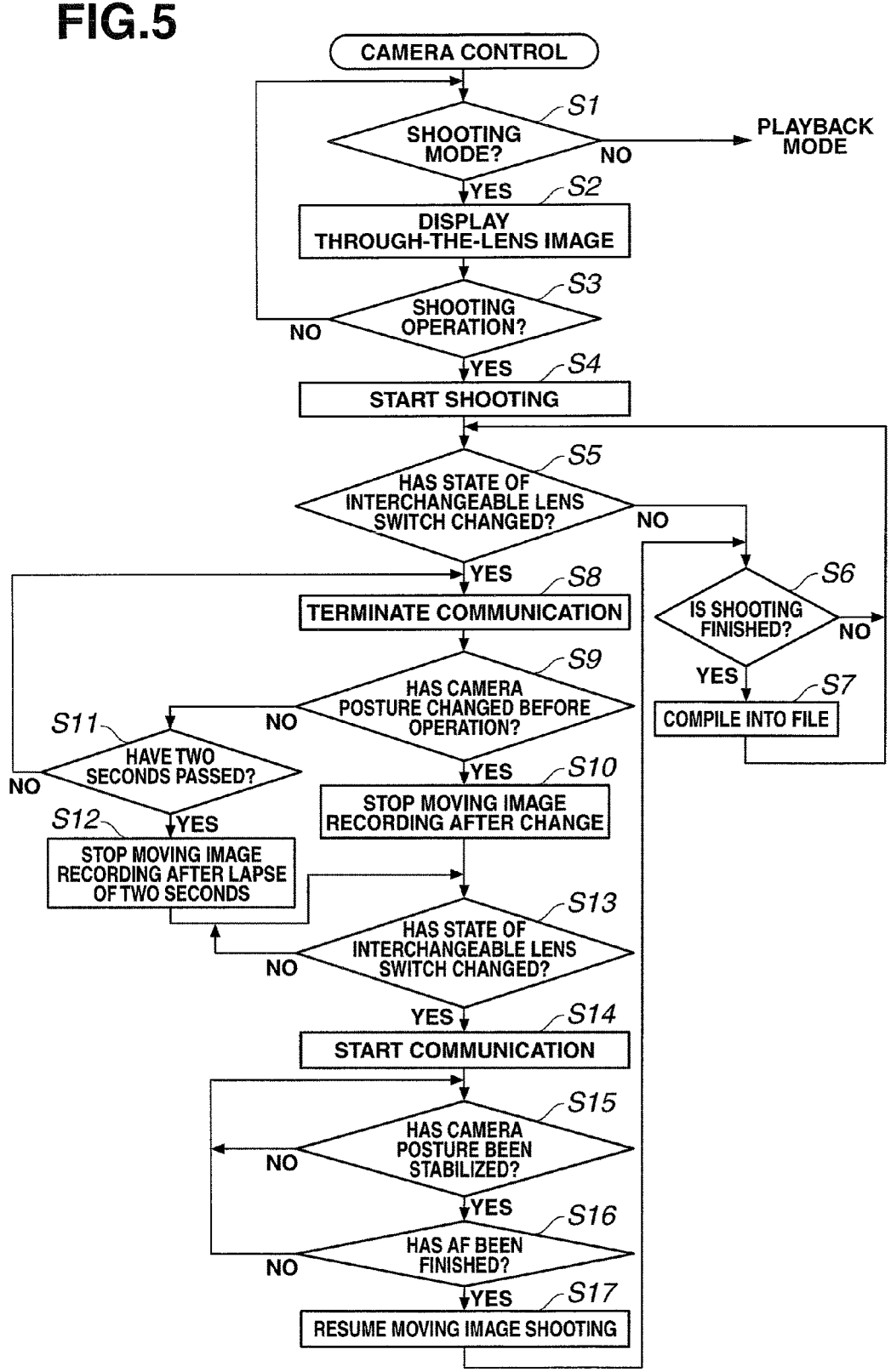
FIG. 5 is a flowchart showing camera control.
Figure 6:
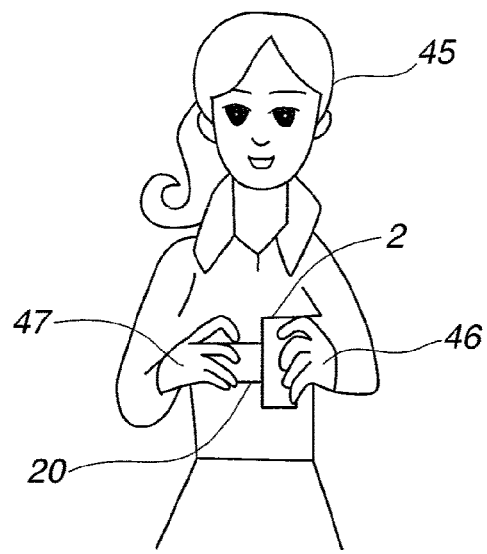
FIG. 6 is an illustrative diagram showing how the interchangeable lenses are attached and detached.
Figure 7A:
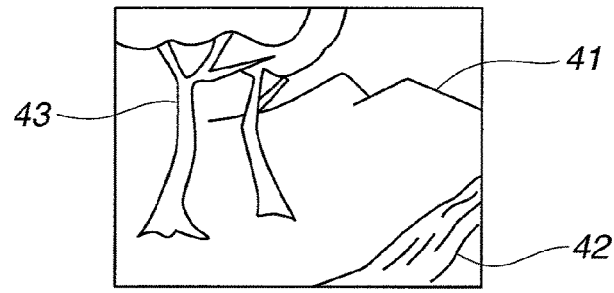
FIGS. 7A to 7C are illustrative diagrams showing images picked up before and after the attachment and detachment in FIG. 6.
Figure 7B:
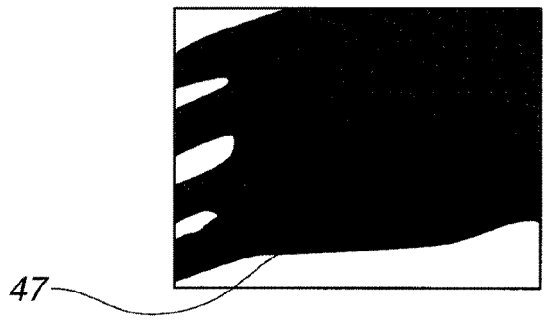
Figure 7C:
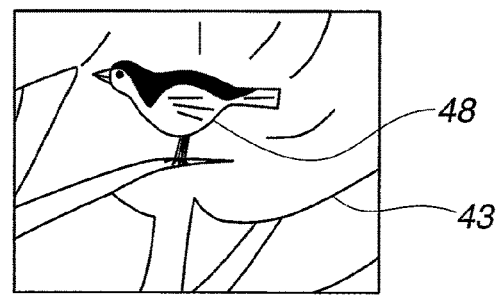

Now, the action of the present embodiment configured as above will be described with reference to FIGS. 4A, 4B, 5, 6, and 7A to 7C. FIGS. 4A and 4B are timing charts for describing operations in the present embodiment, and FIG. 5 is a flowchart showing camera control. FIG. 6 is an illustrative diagram showing how the interchangeable lenses are attached and detached, and FIGS. 7A to 7C are illustrative diagrams showing images picked up before and after the attachment and detachment in FIG. 6.

Conventionally, when the interchangeable lens 20 is replaced, the power is turned off. FIG. 4A serves to describe this operation, where a high level (hereinafter referred to as an H level) indicates a power-on state, and a low level (hereinafter referred to as an L level) indicates a power-off state. After power-on, the shooting start/finish button 4 is pressed to start shooting. In FIGS. 4A and 4B, the H level indicates that a shooting is performed, and the L level indicates that the shooting is finished.

Before a period in which the lens is replaced (the H level in FIGS. 4A and 4B), a user presses the shooting start/finish button 4 to finish the shooting and then turns off the power. After the turn-off, the user replaces the lens. Once the lens is replaced, the user again turns on the power and presses the shooting start/finish button 4 to resume the shooting.

If the operations shown in FIG. 4A are performed, a moving image A' and a moving image B' are obtained according to the operations on the shooting start/finish button 4. These moving images A' and B' are recorded as different files.

In contrast, in the present embodiment, as shown in FIG. 4B, the operations of turning off the power switch and pressing the shooting start/finish button 4 are not needed for the lens replacement period during the process of the moving image shooting. Rather, in the present embodiment, shooting of a moving image A is stopped in response to the replacement of the lens. The shooting is automatically resumed after the lens is replaced, so that a moving image B following the moving image A is obtained.

Specifically, upon power-on of the shooting apparatus 1, the signal processing and control unit 11 determines whether or not a shooting mode is designated in step S1 in FIG. 5. If the shooting mode is not designated, the signal processing and control unit 11 transitions to determining whether or not a playback mode is designated. If the playback mode is designated, the signal processing and control unit 11 plays back a shot image.

If the shooting mode is designated, the signal processing and control unit 11 causes the body display unit 19 to display a picked-up image (through-the-lens image) based on an image pickup signal from the image pickup unit 14 in step S2. The signal processing and control unit 11 then determines whether or not a shooting operation is performed (step S3).

If a shooting operation is performed, the signal processing and control unit 11 starts shooting in step S4. That is, the signal processing and control unit 11 performs predetermined signal processing for the image pickup signal from the image pickup unit 14 and then performs encoding processing, and transfers image information from the recording/playback unit 16 to a recording medium. In this manner, the image information transferred to the recording/playback unit 16 is accumulated. If the finish of the shooting is instructed by operating the shooting start/finish button 4 in this state, the signal processing and control unit 11 advances the process through steps S5 and S6 to step S7 and performs file compilation. Thus, a video file based on the image information transferred to the recording/playback unit 16 is created.

Now, it is assumed that, after the start of the shooting in step S4, the user replaces the interchangeable lens 20. As the interchangeable lens 20 is detached from the lens mount unit 3, the state of the lens replacement switch 5 changes. This change is detected by the attachment/detachment detection unit 5a. The signal processing and control unit 11 detects the detachment of the interchangeable lens 20 based on the detection result of the attachment/detachment detection unit 5a and terminates communication with the interchangeable lens circuit unit 21 in step S8. In next step S9, the signal processing and control unit 11 determines whether or not the camera posture has changed before the replacement operation.

A posture determination unit 15 keeps track of the posture of the shooting apparatus body 2, so that the signal processing and control unit 11 detects a change in the camera posture based on the determination result of the posture determination unit 15. The posture determination unit 15 may be implemented by an acceleration sensor or the like. For example, the signal processing and control unit 11 determines the occurrence of a change in the posture of the shooting apparatus body 2 if the shooting apparatus body 2 has changed its posture 30° or more in one second. If it is determined that the posture of the shooting apparatus body 2 has changed before the operation of replacing the interchangeable lens 20, the signal processing and control unit 11 stops the moving image recording after the change. For example, the posture of the shooting apparatus body 2 may be changed for the operation of replacing the interchangeable lens 20. Even if it is determined that the posture of the shooting apparatus body 2 has not changed, the signal processing and control unit 11 stops the moving image recording after the lapse of two seconds in steps S11 and S12.

Thus, in the present embodiment, in response to the operation of replacing the interchangeable lens 20, the moving image shooting can be stopped without operating the power switch and the shooting start/finish button 4. At this point, the moving image being recorded is not compiled into a file.

For example, it is assumed that an image of a scene shown in FIG. 7A is picked up immediately before the operation of replacing the interchangeable lens 20. FIG. 7A shows that a mountain 41, a river 42, and a tree 43 are shot. Here, in order to replace the interchangeable lens 20, a person 45 who is shooting the scene with the shooting apparatus body 2 held with both hands transfers to a state of grasping the shooting apparatus body 2 with a left hand 46 so that the interchangeable lens 20 is directed rightward near the front of the chest as shown in FIG. 6.

Based on such a change in the state of the shooting apparatus body 2, the signal processing and control unit 11 can detect that the shooting apparatus body 2 has changed its posture. The person 45 detaches the interchangeable lens 20 from the lens mount unit 3 by, for example, twisting the interchangeable lens 20 with a right hand 47. This operation allows the attachment/detachment detection unit 5a to detect the detachment of the interchangeable lens 20.

FIG. 7B shows a picked-up image immediately before stopping the moving image shooting in steps S10 and S12. In the example of FIG. 7B, an image of the right hand 47 of the person who is going to grasp the interchangeable lens 20 for replacing the interchangeable lens 20 is picked up in almost the entire area of the screen.

In step S13, the signal processing and control unit 11 determines whether or not the state of the lens replacement switch 5 has changed. If the attachment of the interchangeable lens 20 is detected based on a detection result of the attachment/detachment detection unit 5a, the signal processing and control unit 11 resumes the communication with the interchangeable lens circuit unit 21 in step S14.

If the signal processing and control unit 11 determines in next steps S15 and S16 that the posture of the shooting apparatus body 2 has been stabilized and auto-focus (AF) has been finished, the signal processing and control unit 11 resumes the moving image shooting in step S17. That is, the signal processing and control unit 11 compresses a video signal based on the image pickup signal from the image pickup unit 14 and provides the compressed video signal to the recording/playback unit 16. The recording/playback unit 16 resumes the stopped moving image recording and continuously records the video signal.

In step S15, the signal processing and control unit 11 detects whether or not the posture of the shooting apparatus body 2 has been stabilized for, e.g., 0.5 second, taking into consideration the time and the response speed required for reliably obtaining a stable image after the replacement of the lens.

FIG. 7C shows a picked-up image immediately after resuming the moving image shooting. The example of FIG. 7C illustrates an image shot with the interchangeable lens 20a having the telephoto lens unit 26a. In FIG. 7C, a bird 48 is perching on the tree 43. That is, FIGS. 7A to 7C show changes in the picked-up images, occurring while the shooting is performed with the interchangeable lens 20c having the wide-angle lens unit 26c, then the interchangeable lens 20c is detached and replaced with the interchangeable lens 20a, and the shooting is resumed.

If the finish of the shooting is instructed by operating the shooting start/finish button 4, the signal processing and control unit 11 advances the process from step S6 to step S7 and generates a video file based on the moving image being recorded.

Thus, in the present embodiment, sequential moving images before and after replacing the interchangeable lens can be recorded as a single video file. The user now does not need to operate the shooting start/finish button and the power switch but can connect the moving images before and after the operation of replacing the interchangeable lens and can record the connected moving images as a single video file. In this manner, user-intended picked-up images can be compiled into a file, and a moving image with a high video effect achieved through the image pickup utilizing more than one interchangeable lens can be created from the generated video file.

Also, since the image immediately before the operation of replacing the interchangeable lens can be recorded, it can be known from the video file that the lens has been replaced. After the lens replacement operation, the recording of the moving image is resumed once the posture of the shooting apparatus body is stabilized and auto-focus is finished. This can prevent disordered images from being left in the video file.

Second Embodiment

Figure 8:
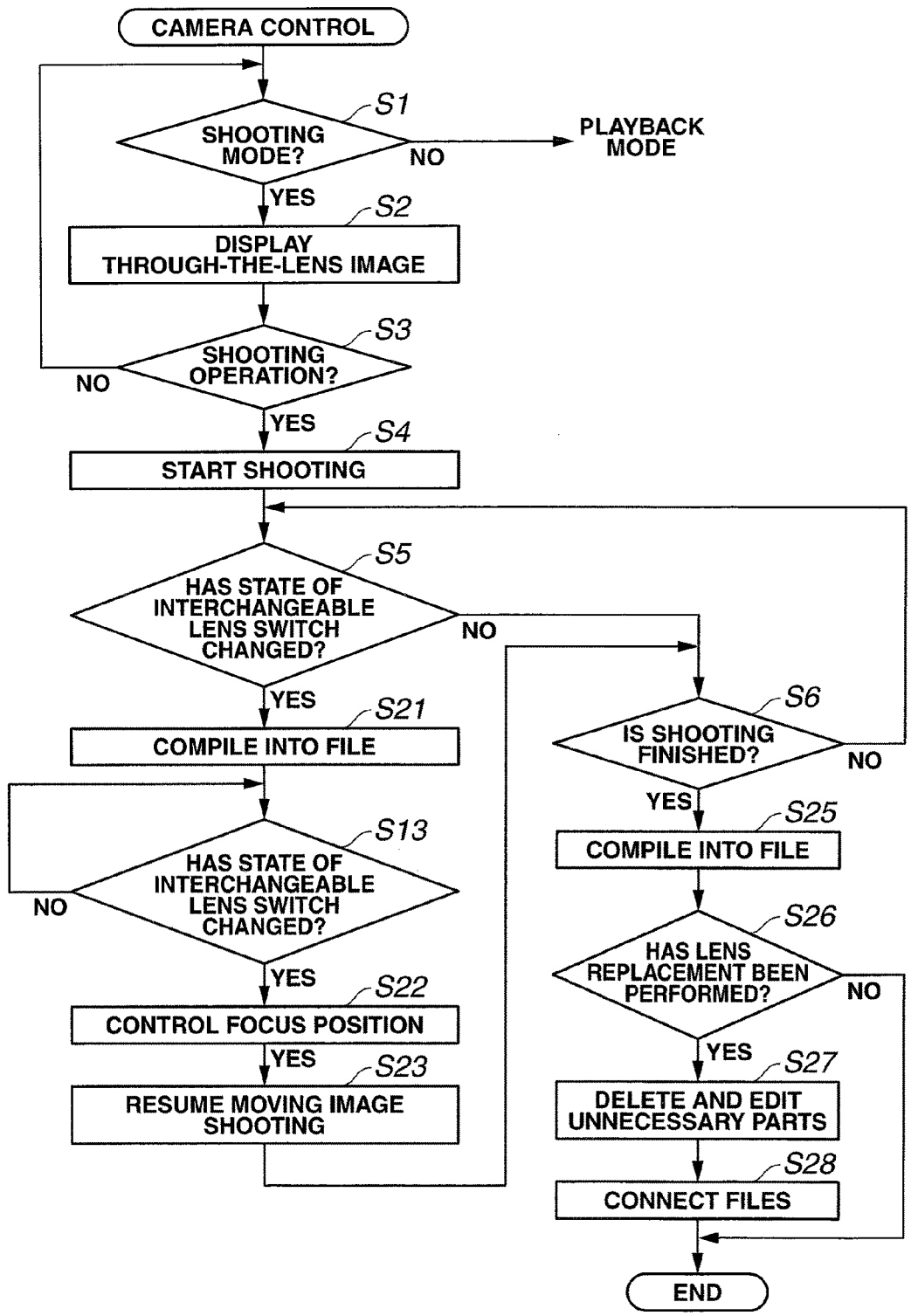
FIG. 8 is a flowchart according to a second embodiment of the present invention.

FIG. 8 is a flowchart according to a second embodiment of the present invention. In FIG. 8, the same steps as in FIG. 5 are given the same symbols and will not be described. The hardware configuration in the present embodiment is the same as in the first embodiment, and the present embodiment only differs from the first embodiment in the control by the signal processing and control unit 11.

In the present embodiment, if a change in the state of the lens replacement switch 5 is detected by the attachment/detachment detection unit 5a, the signal processing and control unit 11 compiles the moving image into a file in step S21 in FIG. 8. That is, once the operation of replacing the interchangeable lens 20 is started, the signal processing and control unit 11 controls the recording/playback unit 16 to compile the moving image recorded so far into a video file.

When the operation of replacing the interchangeable lens 20 is finished and the attachment of the interchangeable lens 20 is detected by the attachment/detachment detection unit 5a, the signal processing and control unit 11 controls the focus position in step S22 and resumes the moving image shooting in step S23. Thus, the signal processing and control unit 11 compresses a video signal based on a picked-up image from the image pickup unit 14 and provides the compressed video signal to the recording/playback unit 16. The recording/ playback unit 16 resumes the recording of the image information from the signal processing and control unit 11.

Thereafter, the same operations are repeated until it is determined that the shooting is finished in step S6. When the shooting is finished, the signal processing and control unit 11 compiles the video signal into a file.

Then, in the present embodiment, the signal processing and control unit 11 determines in step S26 whether or not lens replacement has been performed. If lens replacement has never been performed after the start of the shooting in step S4, the process is terminated. If lens replacement has been performed once or more after the start of the shooting in step S4, the signal processing and control unit 11 deletes and edits unnecessary parts in next step S27 and, in step S28, connects all video files compiled in steps S21 and S25 into a single video file.

In this manner, in the present embodiment as well, the moving images before and after the operation of replacing the interchangeable lens can be recorded as a single video file.

Figure 9:
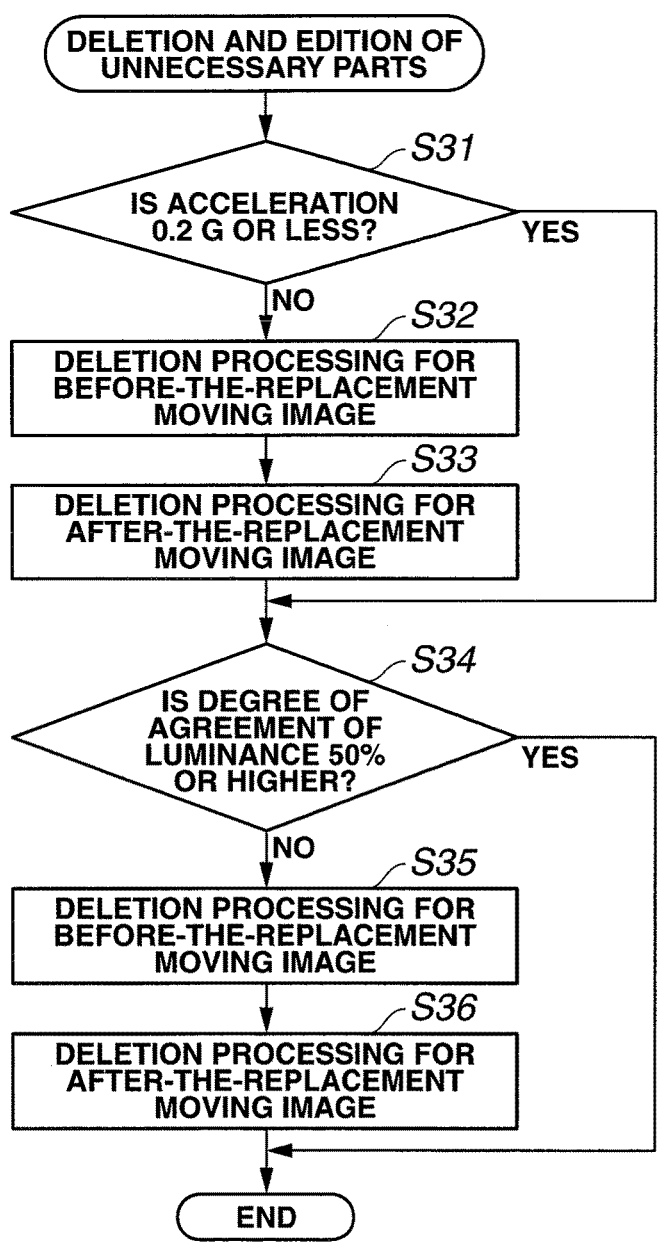
FIG. 9 is a flowchart showing an example of detailed processing in step S27 in FIG. 8.

FIG. 9 is a flowchart showing an example of detailed processing in step S27 in FIG. 8. FIGS. 10A to 10F are illustrative diagrams for describing the processing in FIG. 9, and FIGS. 11A to 11C are waveform diagrams for describing the processing in FIG. 9.

In step S31 in FIG. 9, the signal processing and control unit 11 determines whether or not the acceleration of the shooting apparatus body 2 is 0.2 G or less in an unnecessary part determination period. FIGS. 10A to 10F serve to describe the unnecessary part determination period. FIG. 10A shows a state in which the shooting apparatus body 2 has the interchangeable lens 20c attached thereto, and FIG. 10B shows a state in which the interchangeable lens 20c is detached with respect to the state of FIG. 10A. Further, FIG. 10C shows a state in which the interchangeable lens 20a is attached to the shooting apparatus body 2 in the state of FIG. 10B, and FIG. 10D shows a state in which shooting is performed by using the shooting apparatus body 2 with the interchangeable lens 20a attached thereto. In FIGS. 10B and 10C, the shooting apparatus body 2 is tilted for the operation of replacing the interchangeable lens 20. During the process of this lens replacement operation, images that do not need to be recorded may be picked up. Therefore, the period of this lens replacement operation is set as the unnecessary part determination period, and unnecessary images during the unnecessary part determination period are deleted.

For example, the signal processing and control unit 11 sets the unnecessary part determination period as five seconds before the detection of the detachment and after the detection of the attachment of the interchangeable lens 20 by the attachment/detachment detection unit 5a, and performs the acceleration-based determination for this period. The unnecessary part determination period of five seconds account for the time for the user to actually detach the interchangeable lens after transitioning from the shooting state and starting the lens replacement operation, and the time for the user to transition to the shooting state after attaching the other interchangeable lens. Other time lengths may be set as the unnecessary part determination period.

Figure 11A:
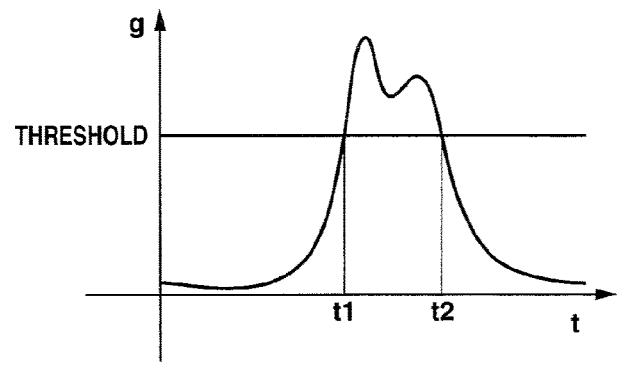
FIGS. 11A to 11C are waveform diagrams for describing the processing in FIG. 9.

The acceleration of the shooting apparatus body 2 can be detected by the posture determination unit 15. If the acceleration of the shooting apparatus body 2 is more than 0.2 G, the signal processing and control unit 11 determines that the user has moved the shooting apparatus body 2 for the operation of replacing the interchangeable lens 20. FIG. 11A shows acceleration changes in the unnecessary part determination period, where the abscissa indicates the time (t) and the ordinate indicates the acceleration (g). In the example of FIG. 11A, the signal processing and control unit 11 determines that the shooting apparatus body 2 has been moved in a period from t1 to t2 in which the threshold is exceeded.

In step S32, in the image during the unnecessary part determination period recorded before the lens replacement operation (hereinafter referred to as a before-the-replacement moving image) (FIG. 10E), the signal processing and control unit 11 deletes frames beginning with a frame determined to involve an acceleration of more than 0.2 G and ending with the last frame. Also, in step S33, in the image during the unnecessary part determination period recorded after the lens replacement operation (hereinafter referred to as an after-the-replacement moving image) (FIG. 10F), the signal processing and control unit 11 deletes frames beginning with the first frame to a frame determined to involve an acceleration of more than 0.2 G.

In next step S34, the signal processing and control unit 11 determines whether or not the degree of agreement of the luminance is 50% or higher in the unnecessary part determination period. That is, the signal processing and control unit 11 compares the average luminance of the first frame in the unnecessary part determination period and the average luminance of each frame in the before-the-replacement moving image. If it is determined that the degree of agreement of the luminance is lower than 50%, it is determined that the lens part is covered with the hand for replacing the lens, for example. Similarly, the signal processing and control unit 11 compares the average luminance of the last frame in the unnecessary part determination period and the average luminance of each frame in the after-the-replacement moving image. If it is determined that the degree of agreement of the luminance is lower than 50%, it is determined that the lens part is covered with the hand for replacing the lens, for example.

Figure 11B:
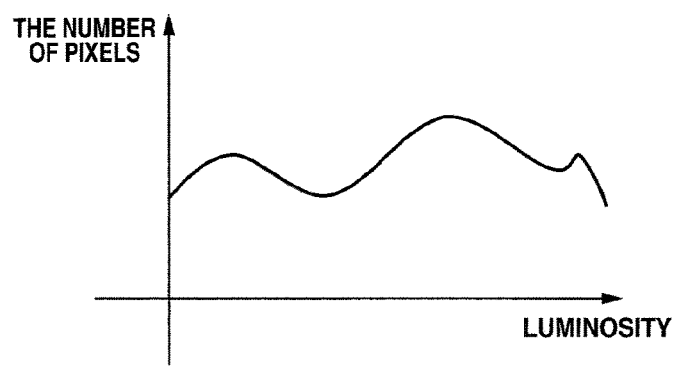
Figure 11C:
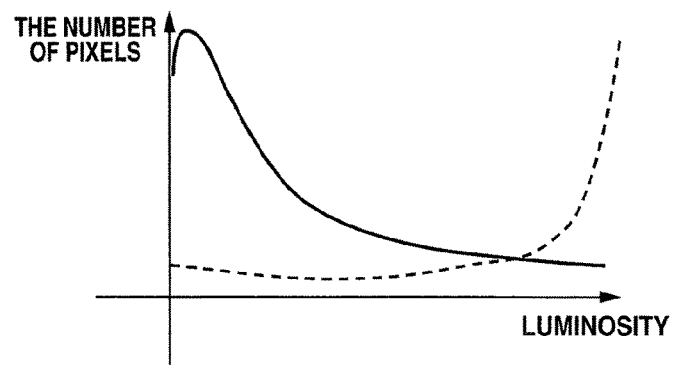

In FIGS. 11B and 11C, the abscissa indicates the luminosity and the ordinate indicates the number of pixels in the image. FIG. 11B shows characteristics in normal shooting, and FIG. 11C shows characteristics in the unnecessary part determination period. As shown in FIG. 11B, the luminosity of each pixel is uniformly distributed in the normal shooting. In contrast, in the unnecessary part determination period before the lens replacement, as shown by a solid line in FIG. 11C, an extremely large number of pixels have relatively low luminosity whereas a small number of pixels have relatively high luminosity. Conversely, in the unnecessary part determination period after the lens replacement, as shown by a dashed line in FIG. 11C, a small number of pixels have relatively low luminosity whereas a large number of pixels have relatively high luminosity.

Such a change in the luminosity distribution is considered to occur due to causes such as the lens being covered with the hand for the lens replacement operation or the lens being directed to the sky after the lens replacement operation.

The signal processing and control unit 11 determines such a change based on the degree of agreement of the luminance. That is, if it is determined that the degree of agreement of the luminance is lower than 50%, the signal processing and control unit 11 deletes frames in the before-the-replacement moving image beginning with the frame determined to have a degree of agreement of the luminance lower than 50% and ending with the last frame in step S35. The signal processing and control unit 11 also deletes frames in the after-the-replacement moving image beginning with the first frame and ending with the frame determined to have a degree of agreement of the luminance lower than 50% in step S36. In step S28 in FIG. 8, the moving images except the deleted frames are connected to create a single video file.

Thus, in the present embodiment, disordered images due to the lens replacement operation in the unnecessary part determination period can be prevented from being recorded.

In the present embodiment, the unnecessary image parts to be deleted are determined based on the acceleration and the degree of agreement of the luminance. However, other approaches may be used to determine the unnecessary parts. For example, in the example of FIGS. 7A and 7B, both the before-the-replacement moving image and the after-the-replacement moving image have the tree 43 and the bird 48 as shooting objects, and therefore the focal lengths of the images can be considered to be about the same. Therefore the unnecessary parts may be determined as follows: if the focal length increases or decreases ±10% or more in the unnecessary part determination period, a moving image part in a relevant period are deleted.

The present embodiment has been described for the exemplary case where the moving image before the lens replacement and the moving image after the lens replacement are compiled into files and then the unnecessary parts are deleted. However, the unnecessary parts may be deleted without compiling the moving image before the lens replacement and the moving image after the lens replacement into files.

Third Embodiment

Figure 12:
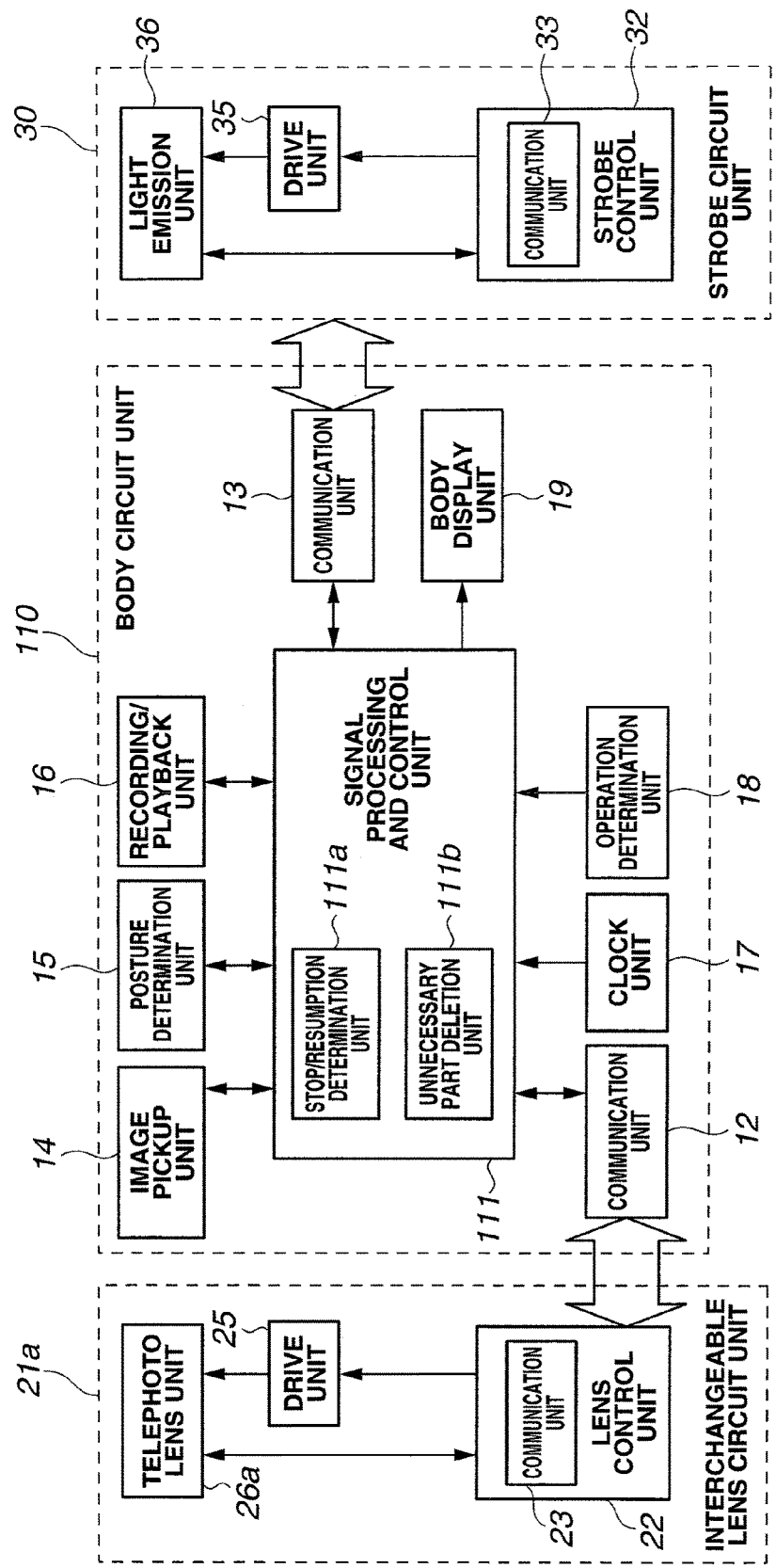
FIG. 12 is a block diagram showing a circuit configuration of a shooting apparatus according to a third embodiment of the present invention.

FIG. 12 is a block diagram showing a circuit configuration of a shooting apparatus according to a third embodiment of the present invention. The shooting apparatus according to the present embodiment only differs from the first embodiment in the configuration of the body circuit unit. The shooting apparatus in the present embodiment also has the lens mount unit 3 on the front face of the shooting apparatus body 2, so that the interchangeable lenses such as 20*a*, 20*b*, and 20*c* shown in FIGS. 2 and 3 can be attached. The shooting start/finish button 4 is disposed on the top portion of the shooting apparatus body 2. The strobe 6 can be detachably attached on the top face of the shooting apparatus body 2 with an attachment unit (not shown).

The shooting apparatus in the present embodiment differs from the shooting apparatus in FIG. 1 in that a body circuit unit 110 is employed instead of the body circuit unit 10. The body circuit unit 110 in the shooting apparatus body 2 is provided with a signal processing and control unit 111 instead of the signal processing and control unit 11 in FIG. 1.

The signal processing and control unit 111 can perform similar operations as the signal processing and control unit 11. The signal processing and control unit 111 differs from the signal processing and control unit 11 in FIG. 1 in the processing at the times of stopping and resuming the recording process.

Specifically, the signal processing and control unit 111 detects the stop and the resumption of the recording process through a stop/resumption determination unit 111*a*. For example, the stop/resumption determination unit 111*a* may determine the stop of the moving image shooting by detecting that the interchangeable lens 20 is covered with a hand or the like, and determine the resumption of the moving image shooting by detecting that the hand covering the interchangeable lens 20 is removed from the interchangeable lens 20. As another example, the stop/resumption determination unit 111*a* may determine the stop and the resumption of the moving image shooting by detecting a tilt of the shooting apparatus body 2. Further, if the shooting apparatus body 2 is provided with a switch for stopping the moving image shooting, the stop/resumption determination unit 111*a* may determine the stop and the resumption of the moving image shooting by detecting the state of this switch.

The signal processing and control unit 111 includes an unnecessary part deletion unit 111*b* that deletes unnecessary parts in the processing of connecting moving images before and after stopping the moving image shooting. The unnecessary part deletion unit 111*b* may also delete unnecessary parts of a moving image at the finish of the shooting.

For example, the unnecessary part deletion unit 111*b* sets, as respective check periods, a predetermined period before a stopping operation, a predetermined period after a resuming operation, and a predetermined period before a finishing operation. The unnecessary part deletion unit 111*b* determines and deletes unnecessary parts from the moving images in the check periods. Each check period can be independently set.

For example, if a camera shake, a tilt of the shooting apparatus body 2, or a luminance change is detected, the unnecessary part deletion unit 111*b* determines a relevant part as an unnecessary part. The signal processing and control unit 111 connects the moving images with unnecessary parts deleted by the unnecessary part deletion unit 111*b* and generates a single video file.

Figure 14A:
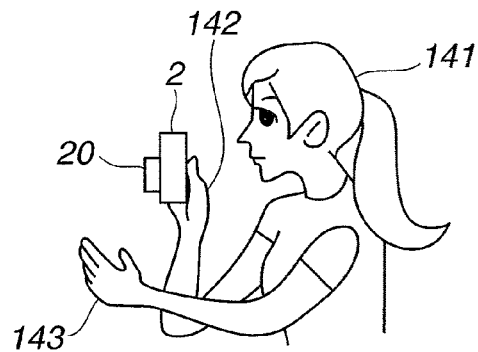
FIGS. 14A to 14D are illustrative diagrams for describing the operations.
Figure 14B:
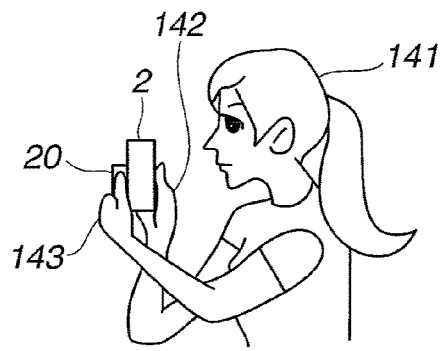
Figure 14C:
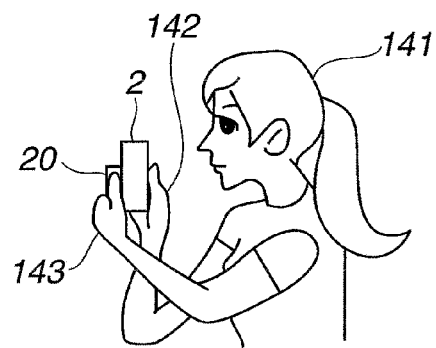
Figure 14D:
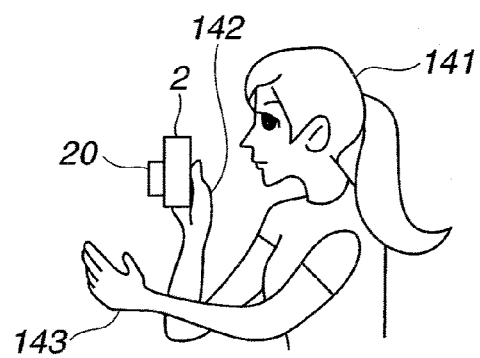
Figure 15A:
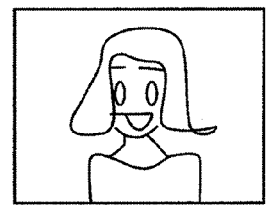
FIGS. 15A to 15C are illustrative diagrams showing picked-up images at the time when shooting is stopped.
Figure 15B:
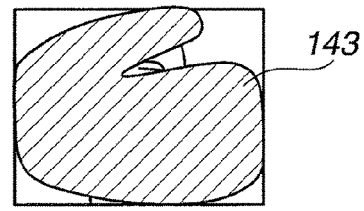
Figure 15C:
Figure 16:
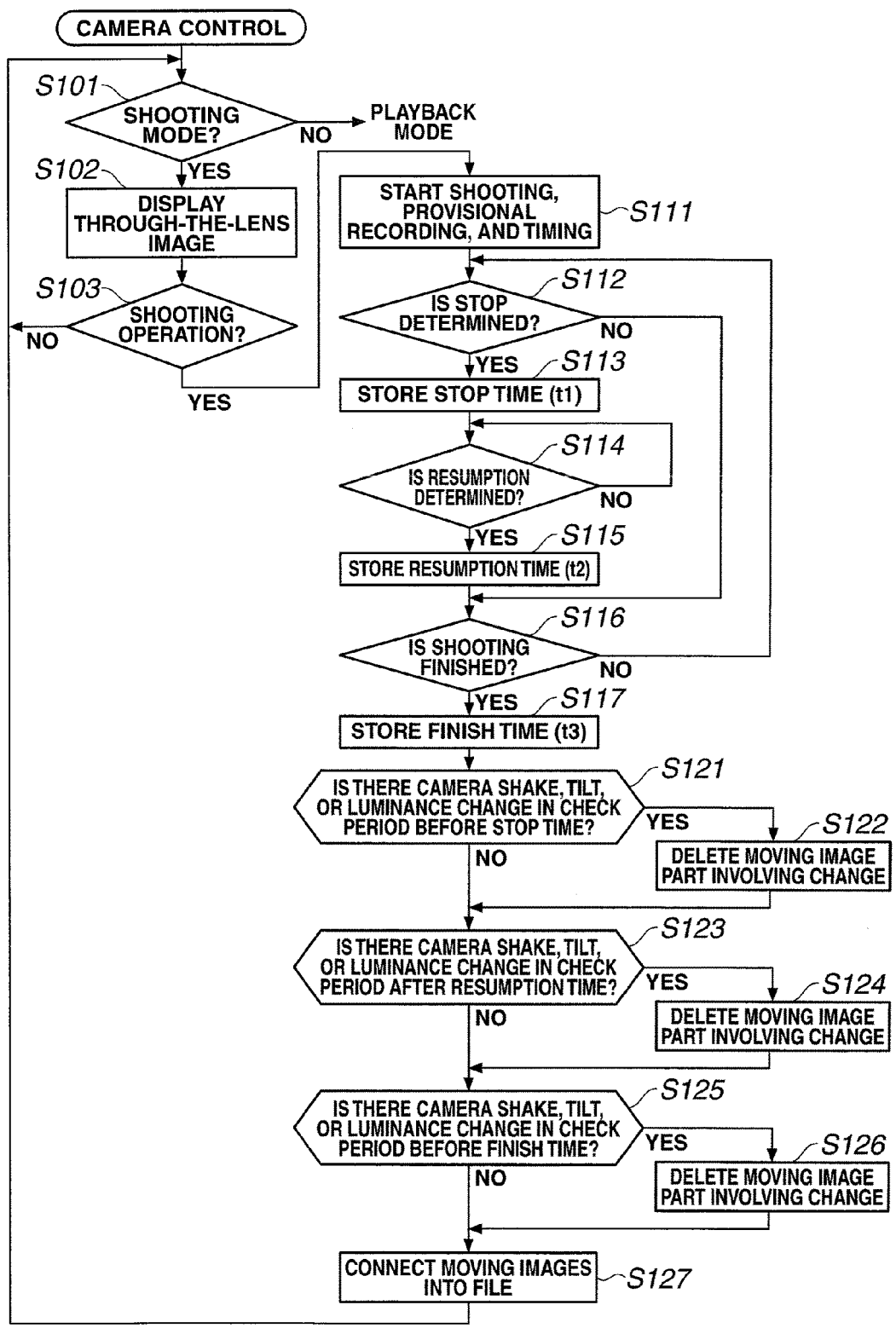
FIG. 16 is a flowchart showing camera control.
Figure 17C:
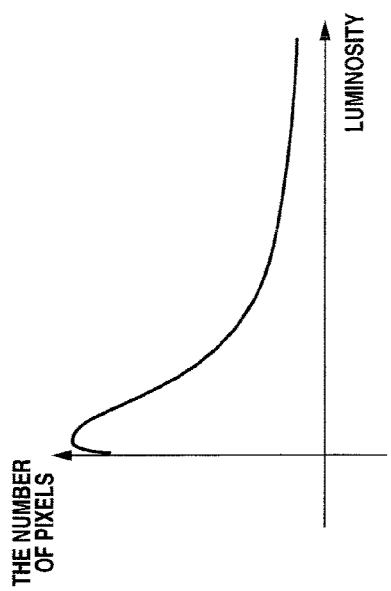
FIGS. 17A to 17C are illustrative diagrams showing how to determine an unnecessary part.
Figure 17B:
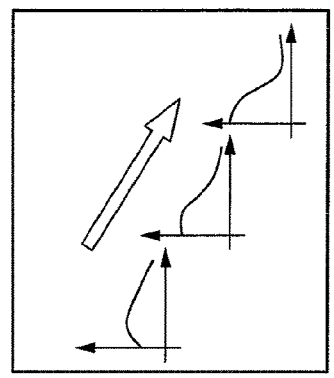
Figure 17A:
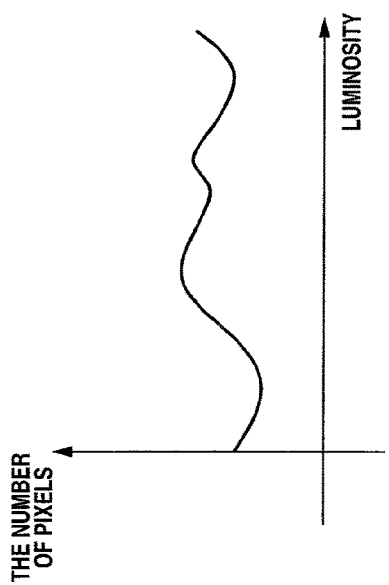

Now, the action of the present embodiment configured as above will be described with reference to FIGS. 13A to 13E, 14 to 16, 17A to 17C, 18A, and 18B. FIGS. 13A to 13E are timing charts for describing operations in the present embodiment, and FIGS. 14A to 14D are illustrative diagrams for describing the operations. FIGS. 15A to 15C are illustrative diagrams showing picked-up images at the time when the shooting is stopped. FIG. 16 is a flowchart showing camera control. FIGS. 17A to 17C are illustrative diagrams showing how to determine an unnecessary part, and FIGS. 18A and 18B are illustrative diagrams showing how to determine the stop and the resumption of the moving image shooting.

First, the overview of the operations of the moving image shooting in the present embodiment will be described with reference to FIGS. 13A to 13E, 14, and 15A to 15C. FIG. 13A shows operations on the shooting start/finish button 4. FIG. 13B shows camera shakes. FIG. 13C shows the brightness of the image. FIG. 13D shows a provisionally recorded moving image. FIG. 13E shows an actually recorded moving image.

The user presses the shooting start/finish button 4 to start shooting. An operation of pushing in the shooting start/finish button 4 to let the button snap back is indicated by an H level and an L level in FIG. 13A. The operation determination unit 18 detects operations on the shooting start/finish button 4 and determines that the start and the finish of the shooting are instructed at the timings of leading edges in FIG. 13A. Based on a signal from the operation determination unit 18, the signal processing and control unit 111 starts moving image recording at a shooting start timing t0 by taking in a video signal from the image pickup unit 14, performing signal processing for the video signal, and providing the video signal to the recording/playback unit 16.

The moving image resulting from such recording based on the user operations (hereinafter referred to as provisional recording) are a provisionally recorded moving image shown in FIG. 13D. In FIG. 13D, H-level periods indicate recording periods. Similarly, for an actually recorded moving image shown in FIG. 13E, H-level periods indicate recording periods.

Here, it is assumed that the user stops the shooting. For example, the user instructs the stop of the shooting with an operation of covering the interchangeable lens 20 on the shooting apparatus body 2 with the user's hand. FIG. 14A shows a state immediately before such an operation of stopping the shooting, and FIGS. 14B and 14C show states of the stopping operation. A user 41 holds the shooting apparatus body 2 with a right hand 142 and covers the interchangeable lens 20 with a left hand 143. It is assumed that a picked-up image in the state of FIG. 14A is an image shown in FIG. 15A. Then, at the stopping operation shown in FIG. 14B, a picked-up image is obtained with a relatively low average luminance in the screen due to the left hand 143 (a shaded portion) covering the most part of the screen, as shown in FIG. 15B for example.

Based on the luminance of the image pickup signal from the image pickup unit 14, the stop/resumption determination unit 111*a* determines whether or not the user has performed the stopping operation. The L-level portion in FIG. 13C indicates that the operation of covering the interchangeable lens 20 with the hand produces a dark image. The stop/resumption determination unit 111*a* determines the L-level period in FIG. 13C as a stop period and stops the recording of the moving image (provisionally recorded moving image) in the recording/playback unit 16.

Given that a start timing and an end timing of the stop period determined by the stop/resumption determination unit 111*a* are t1 and t2, respectively, the provisionally recorded moving image in the recording/playback unit 16 does not include a moving image part between the timings t1 and t2.

FIG. 14C shows a state in which the user performs an operation of stopping the shooting while preparing for shooting another object. FIG. 14D shows that the user performs an operation of removing the left hand 143 from the interchangeable lens 20, that is, an operation of resuming the shooting. FIG. 15C shows a resulting picked-up image in this state.

It is assumed that the user now operates the shooting start/finish button 4 to instruct the finish of the shooting at a timing t3. Then the signal processing and control unit 111 finishes the recording of the provisionally recorded moving image. That is, the provisional recording involves recording a moving image and stopping, resuming, and finishing the recording of the moving image, at timings of detected user operations.

When the user performs the stop operation by covering the lens with the user's hand, the shooting apparatus body 2 changes its posture relatively greatly, causing what is called a camera shake. A moving image during the camera shake period is quite hard to view, and it is generally desired to delete this part as an unnecessary part. Besides a camera shake image, unnecessary parts may include images such as an image picked up while the shooting apparatus body 2 is tilted, and an image with a large amount of luminance change.

In the present embodiment, such unnecessary parts are detected by an unnecessary part deletion unit 111*b* and deleted from the provisionally recorded moving image. The unnecessary part deletion unit 111*b* detects, for example, a camera shake in predetermined periods (detection periods) before and after the stopping operation. The unnecessary part deletion unit 111*b* also detects a camera shake in a predetermined detection period before the finishing operation. The unnecessary part deletion unit IIIb deletes moving image parts determined as unnecessary parts such as a camera shake part in these detection periods from the provisionally recorded moving image, and generates the actually recorded moving image shown in FIG. 13E.

As shown in FIG. 13B, a camera shake occurs even immediately after the operation of starting the recording. However, since a recorded image at the start of the recording operation is likely to be an image that the user wants to shoot, the unnecessary part deletion unit 111*b* does not determine this part as an unnecessary part.

Thus, in the present embodiment, according to the user's shooting operations, parts e.g., a camera shake part can be deleted to record a moving image with relatively small camera shakes as the actually recorded moving image.

Now, mainly with reference to FIGS. 16, 17A to 17C, 18A, and 18B, detailed camera operations will be described.

Upon power-on of the shooting apparatus 1, the signal processing and control unit 111 determines whether or not the shooting mode is designated in step S101 in FIG. 16. If the shooting mode is not designated, the signal processing and control unit 111 transitions to determining whether or not the playback mode is designated (not shown). If the playback mode is designated, the signal processing and control unit 111 plays back a shot image.

If the shooting mode is designated, the signal processing and control unit 111 causes the body display unit 19 to display a picked-up image (through-the-lens image) based on an image pickup signal from the image pickup unit 14 in step S102. The signal processing and control unit 111 then determines whether or not a shooting operation is performed (step S103).

If the user performs an operation of starting shooting with the shooting start/finish button 4 (the timing t0 in FIG. 13A), the signal processing and control unit 111 starts shooting in step S111. Further, in the present embodiment, the signal processing and control unit 111 starts provisional recording, and the unnecessary part deletion unit 111*b* starts timing for defining the determination periods. That is, the signal processing and control unit 111 performs predetermined signal processing for the image pickup signal from the image pickup unit 14 and then performs encoding processing, and transfers image information from the recording/playback unit 16 to a recording medium. In this manner, accumulation (provisional recording) of the image information transferred to the recording/playback unit 16 is started.

Through the stop/resumption determination unit 111*a*, the signal processing and control unit 111 determines whether or not the user performs a stopping operation (step S112). This stop determination is performed until it is determined that the shooting is finished in step S116.

Here, it is assumed that the user performs a stopping operation, for example by covering the interchangeable lens 20 with the user's hand as in FIG. 14B. If the stop/resumption determination unit 111*a* determines that the stopping operation is performed based on the luminance of the image or the like, the unnecessary part deletion unit 111*b* stores the time when the stopping operation is performed (hereinafter referred to as a stop time) (the timing t1 in FIG. 13C) (step S113).

In next step S114, it is determined through the stop/resumption determination unit 111*a* whether or not the user performs a resuming operation. If the user performs a resuming operation, for example by removing the user's hand from the interchangeable lens 20 as in FIG. 14D, the resuming operation is detected by the stop/resumption determination unit 111*a*. Then, the unnecessary part deletion unit 111*b* stores the time when the resuming operation is performed (hereinafter referred to as a resumption time) (the timing t2 in FIG. 13C) (step S115).

If the stopping and resuming operations are each performed more than once before a finishing operation, each time the unnecessary part deletion unit 111*b* stores the stop time and the resumption time.

When the finish of the shooting is instructed by operating the shooting start/finish button 4, the unnecessary part deletion unit 111*b* stores the time when the operation of finishing the shooting is performed (hereinafter referred to as a finish time) (the timing t3 in FIG. 13A).

In step S121, the unnecessary part deletion unit 111b sets a predetermined check period before the stop time and checks for a camera shake, a tilt, or a luminance change in the check period. For example, if the stopping operation of covering the interchangeable lens with the hand has been detected, the unnecessary part deletion unit 111b sets a sufficient time of one second as the check period, for example. If the stopping operation of tilting the shooting apparatus body 2 downward has been detected, for example, the unnecessary part deletion unit 111b sets a relatively short time of 0.5 second as the check period.

If a relatively large camera shake, tilt, or luminance change is detected in the check period, the unnecessary part deletion unit 111b regards the detected part as an unnecessary part and deletes the part from the provisionally recorded moving image (step S122).

Similarly, in step S123, the unnecessary part deletion unit 111b sets a predetermined check period after the resumption time and checks for a relatively large camera shake, tilt, or luminance change in the check period. If a relatively large camera shake, tilt, luminance change, etc., is detected in the check period, the unnecessary part deletion unit 111b regards the detected part as an unnecessary part and deletes the part from the provisionally recorded moving image (step S124).

Also in step S125, the unnecessary part deletion unit 111b sets a predetermined check period before the finish time and checks for a relatively large camera shake, tilt, or luminance change in the check period. If a relatively large camera shake, tilt, luminance change, etc., is detected in the check period, the unnecessary part deletion unit 111b regards the detected part as an unnecessary part and deletes the part from the provisionally recorded moving image (step S126).

Various ways are possible for the unnecessary part deletion unit 111b to detect an unnecessary part. FIGS. 17A to 17C show an exemplary way of detecting an unnecessary part, which is suitable for a case where the stop determination is performed based on the stopping operation of covering the interchangeable lens 20 with the hand.

This stopping operation involves a relatively large luminance change of the image, as described above. FIG. 17A is a histogram showing the luminance of a picked-up image before this stopping operation of covering the lens with the hand, where the abscissa indicates the luminosity and the ordinate indicates the number of pixels. FIG. 17A indicates a uniform distribution of pixels ranging from dark ones to bright ones across the image.

In contrast, FIG. 17C shows an image with an extremely large number of relatively dark pixels and a small number of bright pixels. That is, FIG. 17C indicates a picked-up image at the stopping operation of covering the interchangeable lens 20 with the hand.

FIG. 17B shows histogram changes during the process of the stopping operation of covering the image pickup lens with the hand. As shown in FIG. 17B, during the process of the stopping operation of covering the interchangeable lens 20 with the hand, the number of dark pixels in the image gradually increases.

The unnecessary part deletion unit 111b can detect such changes in the image, for example based on changes in the average luminance of the image. By way of example, the unnecessary part deletion unit 111b determines an image as an unnecessary part if the average luminance of the image decreases to a predetermined threshold or below.

The unnecessary part deletion unit 111b obtains the average luminance of each image by, for example, dividing the product of the number of pixels of each luminosity value by the total number of pixels. The unnecessary part deletion unit 111b sets the average luminance at the point of the stop determination as BAV1. In the check period from the start of the stop period to one second before the start of the stop period, for example, a period in which the average luminance of each image BAV2 is within twice the average luminance BAV1 is determined as an unnecessary part.

Conversely, the unnecessary part deletion unit 111b sets the average luminance at the end timing of the stop period as BAV1. In the check period from the end timing of the stop period to one second after the end timing, a period in which the average luminance of each image BAV2 is within twice the average luminance BAV1 is determined as an unnecessary part.

In this manner, the unnecessary part deletion unit 111b can determine unnecessary parts according to changes in the luminance of the image.

FIGS. 18A and 18B show another exemplary way of detecting an unnecessary part, which is suitable for a case where the stop determination is performed based on the stopping operation of tilting the shooting apparatus body 2.

The unnecessary part deletion unit 111b obtains information on the tilt of the shooting apparatus body 2 based on a determination result of the posture determination unit 15. If the shooting apparatus body 2 is tilted at an angle of predetermined threshold degrees (hereinafter referred to as a moving image stop threshold) or more, the stop/resumption determination unit 111a determines that the stopping operation is performed and sets the stop period. If the tilt of the shooting apparatus body 2 is returned to an angle of predetermined threshold degrees (hereinafter referred to as a moving image resumption threshold) or less, the stop/resumption determination unit 111a determines that the stopping operation is cleared and terminates the stop period. The stop/resumption determination unit 111a may set a common value, for example 45°, as the moving image stop threshold and the moving image resumption threshold.

FIG. 18A shows changes in the tilt of the shooting apparatus body 2 at this stopping operation as a graph, where the abscissa indicates the time and the ordinate indicates the tilt angle of the shooting apparatus body 2. FIG. 18B shows changes in the tilt of the shooting apparatus body 2 at the operation for terminating the stop period as a graph.

As shown in FIG. 18A, a check period extends from a timing at which the increasing tilt of the shooting apparatus body 2 reaches the moving image stop threshold to 0.5 second before this timing. In this check period, the unnecessary part deletion unit 111b determines, as an unnecessary part, a moving image part corresponding to a period in which the tilt is at an angle of predetermined threshold degrees (hereinafter referred to as a first unnecessary moving image determination threshold) or more.

As shown in FIG. 18B, a check period also extends from a timing at which the decreasing tilt of the shooting apparatus body 2 reaches the moving image resumption threshold to 0.5 second after this timing. In this check period, the unnecessary part deletion unit 111b determines, as an unnecessary part, a moving image part corresponding to a period in which the tilt is at an angle of predetermined threshold degrees (hereinafter referred to as a second unnecessary moving image determination threshold) or less. The duration of 0.5 second of the check period may be set to a larger value, assuming variations of the user's operation.

The unnecessary part deletion unit 111b may set a common value, for example 10°, as the first and second unnecessary moving image determination thresholds.

Such state changes of the shooting apparatus body 2 may vary depending on how the camera is held during the shooting or on the user's habit. Therefore, the stop/resumption determination unit 111a and the unnecessary part deletion unit 111b may allow the thresholds for the stop determination and for the deletion of unnecessary parts to be set according to the user's preference.

FIGS. 19A and 19B are illustrative diagrams showing a menu display that aids user operations for setting the thresholds for the stop determination. When an operation signal for the menu display is provided from the operation determination unit 18 to the signal processing and control unit 111 during the shooting, the signal processing and control unit 111 displays the menu display shown in FIG. 19A. The menu display includes a "stop/resume" button. In response to the user selecting this button, the signal processing and control unit 111 transitions to a mode for setting the thresholds for stopping and resuming the moving image shooting and provides a display of FIG. 19B.

In the mode for setting the stop and resumption thresholds, as shown in FIG. 19B, a display is provided for designating what conditions (thresholds) are used to stop and resume the moving image shooting with respect to tilt, lens, focus, and vibration.

FIGS. 20A to 20D and 21A to 21C are illustrative diagrams for describing a case where the stop and the resumption are performed according to the tilt of the shooting apparatus body 2.

Figure 20A:
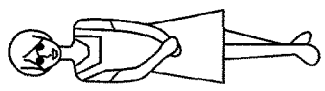
FIGS. 20A to 20D are illustrative diagrams for describing a case where the stop and the resumption are performed according to a tilt of a shooting apparatus body 2.
Figure 20B:
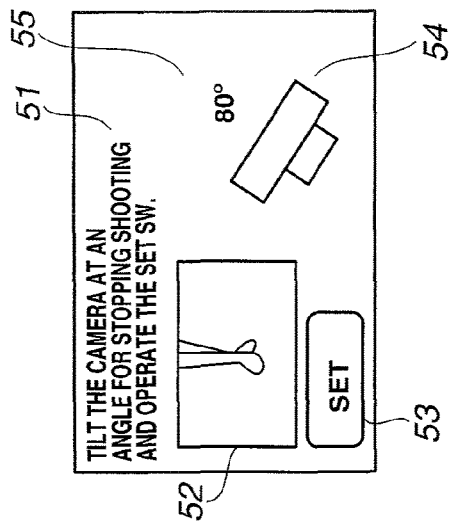

When a "tilt" button in FIG. 19B is designated, a display shown in FIG. 20B is provided. In FIG. 20B, a message display 51 reading as "Tilt the camera at an angle for shooting and operate the set SW," a through-the-lens image display 52, a set button 53, an apparatus tilt display 54, and a tilt angle display 55 are displayed.

Figure 21A:
FIGS. 21A to 21C are illustrative diagrams for describing the case where the stop and the resumption are performed according to a tilt of the shooting apparatus body 2.

Here, it is assumed that the settings are made while a shooting object shown in FIG. 20A is shot. As shown in FIG. 21A, a user 61 shoots the shooting object with the shooting apparatus body 2 held horizontally. FIG. 20B shows this state, in which the through-the-lens display 52 displays the upper body of the shooting object being shot, and the apparatus tilt display 54 and the tilt angle display 55 indicate that the shooting apparatus body 2 is held at 0°. If the user 61 selects the set button 53 in this state, a setting is made such that the shooting is continued while the tilt of the shooting apparatus body 2 is 0°.

Figure 20C:
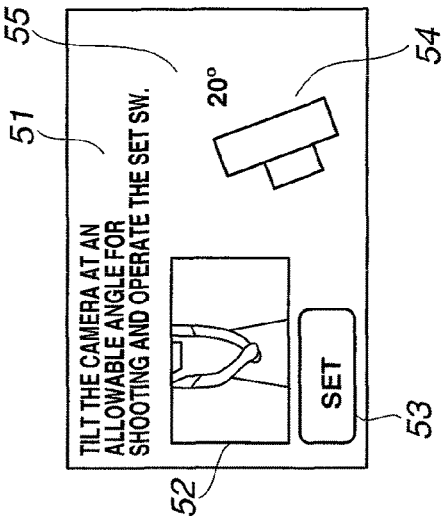
Figure 21B:

In response to the user 61 operating the set button 53 in FIG. 20B, the message display 51 changes to "Tilt the camera at an allowable angle for shooting and operate the set SW" as shown in FIG. 20C. For example, the user 61 tilts the shooting apparatus body 2 as shown in FIG. 21B. In FIG. 20C, the through-the-lens image display 52, the tilt of the shooting apparatus body 2, and the angle (20°) in this state are displayed.

Figure 20D:
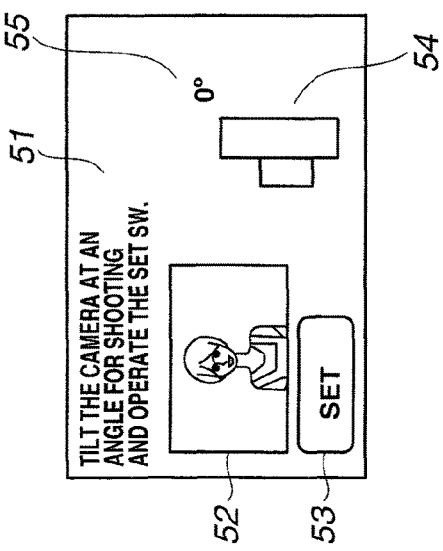
Figure 21C:
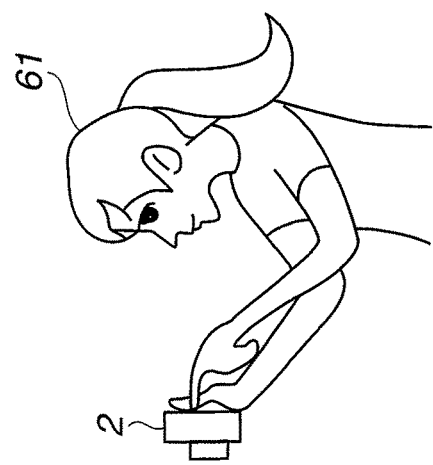

If the user 61 operates the set button 53 in FIG. 20C, a setting is made such that the shooting is allowed up to the tilt angle of the shooting apparatus body 2 at this point. Further, the message display 51 changes to "Tilt the camera at an angle for stopping shooting and operate the set SW" as shown in FIG. 20D. For example, the user 61 tilts the shooting apparatus body 2 as shown in FIG. 21C. In FIG. 20D, the through-the-lens image display 52, the tilt of the shooting apparatus body 2, and the angle (80°) in this state are displayed.

If the user 61 operates the set button 53 in FIG. 20D, the tilt angle of the shooting apparatus body 2 at this point is registered as the threshold for stopping the shooting. That is, in the example of FIG. 20A to 20D, tilting the shooting apparatus body 2 at 80° will cause the shooting to be stopped. Thus, in the example of FIG. 20A to 20D, tilting the shooting apparatus body 2 at 80° or more will cause the moving image shooting to be stopped, and tilting the shooting apparatus body 2 at an angle less than 80° will cause the moving image shooting to be resumed.

Similarly, for stop determination approaches other than the tilt-based approach, the stopping conditions can be appropriately set by setting the thresholds for the times of shooting, allowing shooting, and stopping.

The signal processing and control unit 111 causes the recording/playback unit 16 to compile the provisionally recorded moving image with the unnecessary parts deleted into a file of the actually recorded image (step S27). In this manner, a single video file with the unnecessary parts deleted is generated.

Thus, in the present embodiment, a moving image can be recorded as a single video file even if the stopping operation and the resuming operation are performed between the start and the finish of the shooting instructed with the shooting start/finish button. In this case, in the check periods before the stopping operation, after the resuming operation, and before the finishing operation, unnecessary images such as camera shake parts are automatically deleted from the provisionally recorded moving image to obtain the actually recorded moving image. This enables obtaining a user-intended moving image without the need for cumbersome operations.

The above embodiments have been described for the exemplary case where the stop and the resumption are determined based on changes in the luminance of the image and changes in the tilt of the shooting apparatus body, and the unnecessary parts are determined based on changes in the luminance of the image, and changes in the tilt and shake of the shooting apparatus body. However, there are various ways of determining the stop and the resumption and determining the unnecessary parts.

For example, the stop and the resumption and the unnecessary parts may be determined by detecting external changes such as changes in the acceleration, speed, angular velocity, light quantity, air volume, temperature, object recognition, button input and output, or sound.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. A shooting apparatus comprising:
   a posture determination unit that determines a posture of a shooting apparatus body;
   a stop/resumption determination unit that determines stop and resumption of recording of a moving image being shot by an image pickup unit provided in a shooting apparatus body, based on a change of the posture of the shooting apparatus body determined by the posture determination unit;
   an unnecessary part determination unit that determines an unnecessary part of the moving image based on either (A) a luminance change between frames in a moving image before the stop of the recording determined by the stop/resumption determination unit, or (B) a luminance change between frames in a moving image after the resumption of the recording determined by the stop/resumption determination unit; and
   a recording control unit that records, as a single video file, a moving image obtained by deleting the part determined as being unnecessary based on either (A) a luminance change between frames in a moving image before the stop of the recording, or (B) a luminance change between frames in a moving image after the resumption of the recording.

2. The shooting apparatus according to claim 1, wherein a plurality of interchangeable lenses are selectively attachable to the shooting apparatus body, and the stop/resumption determination unit comprises an attachment/detachment detection unit that detects attachment and detachment of each interchangeable lens to determine the stop and the resumption of the recording of the moving image.

3. The shooting apparatus according to claim 2, wherein the stop/resumption determination unit controls the resumption of the shooting of the moving image after the attachment of the interchangeable lens is indicated by a detection result of the attachment/detachment detection unit and focus control for the interchangeable lens is finished.

4. The shooting apparatus according to claim 2, wherein the recording control unit connects a video file that is based on a moving image part before the stop of the shooting of the moving image and a video file that is based on a moving image part after the resumption of the shooting of the moving image, and records the connected video files as a single video file.

5. The shooting apparatus according to claim 2, wherein the recording control unit refrains from recording, as the video file, a moving image part corresponding to a period in which the posture of the shooting apparatus body is determined as unstable according to a determination result of the posture determination unit, in a moving image part before the stop of the shooting of the moving image and a moving image part after the resumption of the shooting of the moving image.

6. The shooting apparatus according to claim 2, wherein the recording control unit refrains from recording, as the video file, a moving image part corresponding to a period in which a luminance change is determined to exceed a predetermined value, in a moving image part before the stop of the shooting of the moving image and a moving image part after the resumption of the shooting of the moving image.

7. The shooting apparatus according to claim 1, wherein the unnecessary part determination unit determines the unnecessary part of the moving image based on at least one of the state change of the shooting apparatus body and the state change of the moving image, in at least one of a first check period before the stop and a second check period after the resumption.

8. The shooting apparatus according to claim 7, wherein the unnecessary part determination unit determines the unnecessary part of the moving image based on at least one of the state change of the shooting apparatus body and the state change of the moving image, in a third check period before finish of the recording of the moving image.

9. The shooting apparatus according to claim 8, wherein the unnecessary part determination unit determines the unnecessary part based on a tilt or a shake of the shooting apparatus body.

10. The shooting apparatus according to claim 8, wherein the stop/resumption determination unit determines the stop based on a decrease of a luminance of the moving image below a predetermined threshold, and determines the resumption based on an increase of the luminance of the moving image above a predetermined threshold in the stop period.

11. The shooting apparatus according to claim 7, wherein the unnecessary part determination unit determines the unnecessary part based on a tilt or a shake of the shooting apparatus body.

12. The shooting apparatus according to claim 7, wherein the stop/resumption determination unit determines the stop based on a decrease of a luminance of the moving image below a predetermined threshold, and determines the resumption based on an increase of the luminance of the moving image above a predetermined threshold in the stop period.

13. The shooting apparatus according to claim 7, wherein the stop/resumption determination unit determines the stop based on a tilt of the shooting apparatus body at an angle of predetermined degrees or more, and determines the resumption based on a tilt of the shooting apparatus body at an angle of predetermined degrees or less in the stop period.

14. A shooting method comprising:

a posture determination step of determining a posture of a shooting apparatus body;

a stop/resumption determination step of determining stop and resumption of recording of a moving image being shot by an image pickup unit provided in the shooting apparatus body, based on a change of the determined posture of the shooting apparatus body;

an unnecessary part determination step of determining an unnecessary parts of the moving image based on either (A) a luminance change between frames in a moving image before the stop of the recording determined in the stop/resumption determination step, or (B) a luminance change between frames in a moving image after the resumption of the recording determined in the stop/resumption determination step; and a recording control step of recording, as a single video file, a moving image obtained by deleting the part determined as being unnecessary based on either (A) a luminance change between frames in a moving image before the stop of the recording, or (B) a luminance change between frames in a moving image after the resumption of the recording.

* * * * *

UNITED STATES PATENT AND TRADEMARK OFFICE
CERTIFICATE OF CORRECTION

PATENT NO. : 8,824,853 B2  
APPLICATION NO. : 13/177131  
DATED : September 2, 2014  
INVENTOR(S) : Tsubasa Kasai Page 1 of 1

It is certified that error appears in the above-identified patent and that said Letters Patent is hereby corrected as shown below:

On the title page of the patent, item (73) Assignee, should be corrected as shown below:

"Olympus Medical Corp., Tokyo (JP)"

should read:

--Olympus Imaging Corp., Tokyo (JP)--.

Signed and Sealed this  
Twenty-fourth Day of May, 2016

Michelle K. Lee  
*Director of the United States Patent and Trademark Office*